Sept. 3, 1968 G. LE ROY 3,400,196
METHOD FOR THE PERMANENT COMPRESSION OF A SHEET OF
FLEXIBLE POLYURETHANE FOAM
Filed June 30, 1964
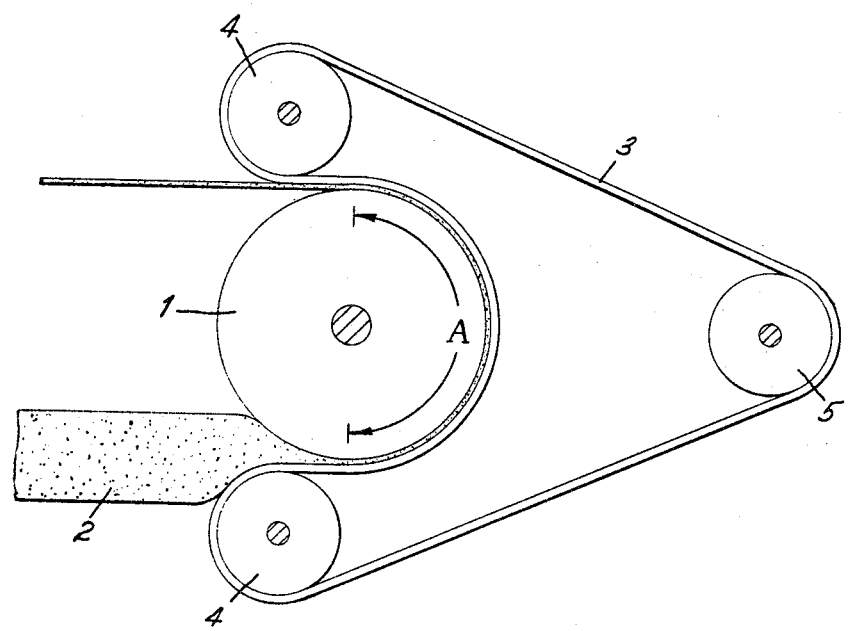
INVENTOR.
GENE Le ROY
BY George A. Skoler
ATTORNEY

United States Patent Office 3,400,196
Patented Sept. 3, 1968

3,400,196
METHOD FOR THE PERMANENT COMPRESSION OF A SHEET OF FLEXIBLE POLYURETHANE FOAM
Gene LeRoy, Charleston, W. Va., assignor to Union Carbide Corporation, a corporation of New York
Filed June 30, 1964, Ser. No. 379,268
9 Claims. (Cl. 264—321)

ABSTRACT OF THE DISCLOSURE

The process is for the continuous permanent compression of flexible polyurethane foam using a rotated heated cylindrical drum and an endless moving belt to effect the compression.

---

This invention relates to the continuous production of permanently compressed polyurethane foam materials. More particularly, this invention relates to the continuous production of permanently compressed, moisture-vapor permeable, polyurethane foam through heat compression of flexible (open-cellular) polyurethane foam by passing a sheet of the foam against a heated, rotating, cylindrical drum and compressing the foam on the drum by tension exerted on an endless moving belt exerting force on the free side of the foam sheet.

Heretofore, permanently compressed polyurethane foam has been taught as being produceable by hot compression of flexible polyurethane foam in a heated platen press or between calender rolls. A heated platen press has been found adequate for small scale laboratory production but cannot be employed for large scale continuous sheet production since compression lines are left along the continuous sheet and the degree of compression along the continuous sheet is not adequately uniform. Moreover, because of the slow operation of such a press, its use for larger scale production is economically prohibitive. On the other hand, calender rolls have been found to be essentially inoperative because such presses are incapable of providing reasonable compression residence times needed to achieve the desired results.

There has been found a relatively simple procedure for the continuous and large scale manufacture of permanently compressed, moisture-vapor permeable polyurethane foam which completely avoids the above difficulties. Such is accomplished by placing one side of a sheet of flexible (open-cellular) polyurethane foam having a thickness not greater than about two inches on a heated, rotating, cylindrical drum and compressing said foam sheet against the drum to the desired thickness by contacting the other side of the sheet with an endless belt maintained under tension. It is important that the drum have a temperature of at least 100° C., preferably at least 150° C., and that the temperature of the drum and/or belt, and the tension exerted on the belt (and hence the degree of foam compression) be coupled and coordinated with the residence time of the foam against the drum and belt (the time of passing of the foam sheet over zone A of the drum 1) so that the foam withdrawn from the drum possesses a permanently compressed condition.

To more particularly illustrate this invention, reference is made to the accompanying drawing. It is to be understood that this invention is not intended to be construed to be limited by the drawing.

The drawing schematically illustrates a rotating cylindrical drum 1 and moving endless belt 3 assembly in which permanent compression is effected. Endless belt 3 is maintained under tension and forced against drum 1 by moving cylindrical drive rolls 4 forward and about drum 1 or by moving belt tension roll 5 away from drum 1. Between belt 3 and drum 1 is fed uncompressed, flexible, polyurethane foam sheet 2. Greater productivity is obtainable by feeding two or more superimposed sheets of foam, each separated by release agents such as release paper or plastic which is not fused at the compression temperature.

The speed of belt 3 is desirably coordinated with the rotational speed of drum 1 so that the foam is not torn or mutilated during compression. This can be effected by controlling the speed of drive rolls 4 with a variable speed motor. However, in some cases, particularly when the foam sheet is thick enough, the frictional contact between the drum, foam, and belt may be sufficient to move the belt at a speed synchronized with the rotational speed of drum 1 and foam.

Drum 1 is internally heated by steam or a liquid heat transfer agent (e.g. Dowtherm, a eutectic mixture of diphenyl and diphenyl oxide) or such heating agents in combination with electrical heating coils. Of course, drum 1 may be also heated only by electric heating coils. In addition, belt 3 may be optionally heated if further heating is desired. For example, a bank of infrared heating lamps may be employed to heat the belt during and/or before the point at which the foam is compressed. Other heating means are obviously employable.

A critical factor in the employment of the process of this invention is the residence time at which the foam is maintained under hot compression. The foam must be heat compressed for a time sufficient to achieve permanent compression. Two processing conditions govern the residence time needed, to wit, temperature and pressure. Of the two, pressure appears to exert the most influence toward the success of achieving permanent compression of the uncompressed foam. In any event, these conditions, i.e., residence time, pressure, and temperature, should be correlated to not only achieve permanent compression of the foam sheet but to also produce a product possessing porosity to moisture. It is particularly desirable to employ an average drum or belt pressure on the foam as it passes between drum 1 and belt 3 of at least about 5 pounds per square inch and typically not in excess of 200 pounds per square inch, preferably not in excess of 120 pounds per square inch. The pressure is typically controlled by moving belt tension roll 5 toward or away from drum 1.

The above-described process provides unforeseen advantages. For example, the foam on compression between the belt and drum is typically stretched, i.e., oriented in the direction of the passage through drum 1 and belt 3. Stretching and compression of the foam product typically provides a permanently compressed foam sheet possessing greater strength than the unstretched but compressed sheet. Moreover, because the residence time of heat compression can be varied by varying the temperature and pressure, different surface effects and degrees of permanency of compression are obtainable. For example, putting all of the heat of compression in drum 1 causes the production of a compressed foam sheet which is shiny and smooth on the side that was in contact with the drum and coarse on the side which was in contact with the belt. When the drum and belt are heated and residence time is sufficient, both surfaces are smooth and shiny.

The obtaining of a coarse surfaced compressed product is the result of the temperature gradient effect during compression. The foam possesses insulative qualities so that when heated through only one surface during compression, the other surface is often not as permanently set or is sufficiently permanently set and the coarse surface results from the diminishment in foam flow characteristics while in contact with a relatively cool surface. Also, it has been found that during heat compression the foam sheet exhibits flow at its surfaces when the surfaces are sufficiently hot. This is particularly noticeable when the foam sheet, prior to compression, is resin impregnated through and across at least one surface, and the impregnated sheet is heat compressed. The resulting permanently compressed sheet possesses a smoother and more polished surface. The sheet may be embossed with any design during or after compression by passing it through and against embossing rolls.

A permanently compressed polyurethane foam is obtained by heat-compressing a solid, flexible (open-cellular) polyurethane to a thickness at least 50 percent of its original thickness. By permanent state of compression it is meant that the compressed product does not revert to its original thickness or to a thickness which is substantially in excess of that to which it was compressed when the compressed foam is flexed a multiplicity of times. A particularly stringent test and typically employed herein to denote permanent compression, involves splitting a section of a compressed foam sheet at a plane parallel of the surfaces of the sheet and intermediates of the surfaces and then slowly pulling apart at the section, by hand, each surface from the other. If, upon pulling the sheet apart, thereby tearing across the plane, there occurs an enlargement of the cells of the foam at the tear interface so that the foam cells enlarge and spread across the split area, i.e., the tear interface, as the area or interface is enlarged and these cells remain permanently enlarged, then the foam sheet is not considered permanently compressed.

The polyurethane foams which are usable in making the compressed products of this invention are typically classed as open cell materials. This means that they are flexible foams. The starting foams desirably possess significant porosity or perviousness to air, water-vapor and liquid-water. It is preferred that the polyurethane foams are at least substantially cured and most desirably, the foams are fully cured prior to use.

The term "open cell" means that at least a portion of the cells of the foam are openly connected. That is, some of the walls of the cells are open to adjacent cells. The cells of solid, flexible polyurethane foams are typically defined by a network of interlinking struts. These struts may possess webs of plastic which are formed at the junctures of the struts to provide a thin film which partially or totally encloses the open area between the joined struts. At least some of the cells possess films which no more than partially enclose the open area between the joined struts. In some foams, most or all of the cells are completely devoid of such films, and hence the areas between the struts are totally open. The solid, flexible foams can be compressed at room temperature (about 25° C.) to a thickness of about one-half of their thickness yet rebound to almost all or all of their original thickness when pressure is relieved.

The polyurethane foams are typically produced by the reaction of polyisocyanate and an active hydrogen-containing compound (as determined from the Zerewitinoff Method, Journal of the American Chemical Society, vol. 49, p. 3181 (1927)) and these are foams made of a resin(s) containing a urethanyl

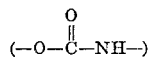

linkage therein.

The flexible polyurethane foams are typically made utilizing polyisocyanates which possess at least two isocyanato groups each bonded to a carbon atom of an organic radical. The isocyanate may contain 3, 4, or more isocyanato groups. Illustrative of such compounds are, e.g., aliphatic, cycloaliphatic, and aromatic isocyanates. A significant list of such compounds is disclosed in Siefken, Annalen, 562, pages 122 to 135 (1949). Illustrative of particularly desirable polyisocyanates include the following:

tolylene-2,4 and 2,6-diisocyanate,
4,4-methylene-di-ortho-tolylisocyanate,
2,4,4'-triisocyanatodiphenylether,
toluene-2,3,6-triisocyanate,
1-methoxy-2,4,6-benzenetriisocyanate,
meta-phenylenediisocyanate,
4-chloro-meta-phenylenediisocyanate,
4,4-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
diphenylmethane-p:p' or
m:m'-diisocyanate,
bis(4-isocyanatocyclohexyl)methane,
stilbene diisocyanates,
dixylylmethane diisocyanates,
2,2-bis(4-isocyanatophenyl)propane,
diphenylmethane tetraisocyanates,
trimethylbenzene triisocyanates,
ditolylmethane triisocyanates,
triphenylmethane triisocyanates,
3,3'-dimethyldiphenylene-4,4'-diisocyanate,
3,3'-dimethoxydiphenylene-4,4'-diisocyanate,
diphenyl triisocyanates and
diphenylcyclohexane-p:p'-diisocyanate.

The preferred isocyanates are the tolylene diisocyanates and the diphenylmethane diisocyanates.

The active hydrogen-containing compounds which are suitable co-reactants with the organic polyisocyanates to form the polyurethane foams of this invention include, e.g., organic polyols and organic polyesters possessing residual hydroxyl groups.

Illustrative organic polyols are those compounds which possess at least two free hydroxyl groups bonded to a carbon atom of the organic radical. Preferably, the hydroxyl groups are bonded to different carbon atoms of the radical. Illustrative of such organic polyols are, e.g., the alkane diols, alkane triols, alkane tetrols, alkane pentols, alkane hexols, and the like; ether alcohols such as polyalkylene oxide diols, triols, tetrols, hexols, and the like; aromatic polyhydroxy compounds such as mono-, di-, tri-, tetra, and other multiaromatic nuclei-containing compounds possessing at least two hydroxyl groups bonded directly to a carbon atom of an aromatic nucleus and/or to a polyvalent organic radical which is jointly bonded to at least one hydroxyl group and an aromatic nucleus.

Illustrative polyols which may be utilized in the process of this invention include, e.g., mono-, di-, tri-, and tetra-alkylene glycols of from 2 to 8 carbon atoms per alkylene moiety such as ethylene, propylene, butylene, pentylene, and the like glycols. Inclusive of some of these polyols are polyols having a molecular weight of at least 100 which are characterized by the formula:

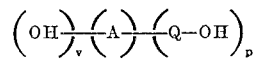

wherein A may be a radical such as

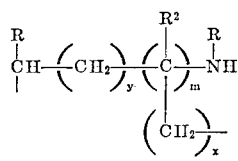

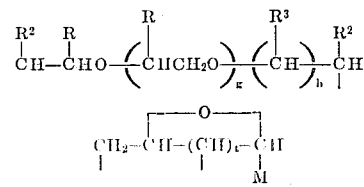

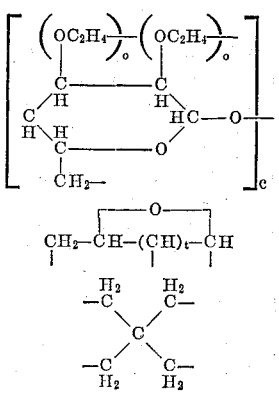

and

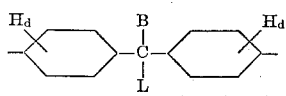

Q is bonded to A by an ether (—O—) bridge of an oxyalkylene radical and is at least one oxyalkylene radical, preferably at least two recurring oxyalkylene radicals, said oxyalkylene moieties having from 2 to 18 carbon atoms, preferably from 2 to 8 carbon atoms; $p$ is an integer of at least 1, preferably equal to the free valence of the radical A and is typically an integer of from 1 to 10; $v$ is an integer equal to the free valence of the radical A minus the value of $p$ and typically is a value of from 0 to 4; each R, $R^2$ and $R^3$ may be one of hydrogen, an alkyl group of from 1 to 18 carbon atoms, preferably from 1 to 4 carbon atoms, cycloalkyl of from 5 to 7 carbon atoms, or an aryl group; $y$ is an integer of from 1 to 10; $m$ is an integer of from 0 to 8; $g$ can be an integer of from 1 to 10; $h$ can be an integer of from 1 to 8; $x$ is one of the integers 0 or 1; $t$ is an integer of from 2 to 4; $c$ is a number having an average value of at least 2; M is a radical which can be alkyl, aralkyl,

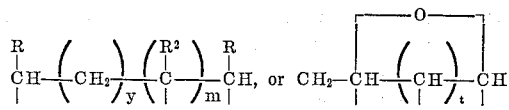

$o$ is one of the integers 0 to 1; B is hydrogen or an alkyl group of from 1 to 4 carbon atoms; L is B or

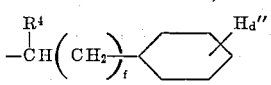

wherein the free valence of

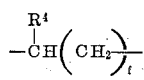

is the valence bond of L; $d$, $d'$, and $d''$ are each equal to 4 or 10; $f$ is either a value of 0 or 1; and $R^4$ is methyl when $f$ is 0 and hydrogen when $f$ is 1.

Illustrative polyols encompassed by the above formula are those formed by the addition of alkylene oxides to an initiating polyhydroxy substituted organic compound in which the hydroxy substituents are bonded to carbon of the organic compound.

The result of such addition forms a hydroxylated alkylene oxide adduct of said hydroxy substituted organic compound. Thus, various 1,2-alkylene oxides such as ethylene oxide, 1,2-propylene oxide, 1,2-butylene oxide, 1,2-hexylene oxide, 1,2-dodecylene oxide, cyclohexyl ethylene oxide, and styrene oxide or mixtures thereof, may be polymerized by contact with a basic or acidic catalyst in the presence of the initiating polyhydroxy organic compound. The aforementioned 1,2-alkylene oxides may be copolymerized with 1,3- and 1,4-alkylene oxides by acid catalytic polymerization in the presence of the initiating polyhydroxy organic compound. Illustrative of various 1,3- and 1,4-alkylene oxides include 1,3-propylene oxide, 1,4-butylene oxide (tetrahydrofuran), 1,4-pentylene oxide, 1,4-octylene oxide, etc., and 1,4-epoxy-2-phenylbutane, and the like. The 1,3- and 1,4-alkylene oxides may be reacted above with the initiating hydroxy compound to form useful polyols.

The initiating polyhydroxy organic compound may be any one of the polyols previously described and include, 1,2-alkylene glycol, 1,3-alkylene glycol, 1,4-alkylene glycol, alkylene triols, alkylene tetrols, alkylene pentols, alkylene hexols, polyalkylene glycols, etc. Illustrative of these materials include, ethylene glycol, 1,2- and 1,3-dihydroxy propane, 1,2-, 1,3-, 1,4-dihydroxy pentane, 1,2-, 1,3-, 1,4-dihydroxy hexane, 1,2-, 1,3-, 1,4-dihydroxy decane, 1,2-, 1,3-, 1,4-dihydroxy octadecane, and the alpha, omega diols of the above hydrocarbon moieties not indicated as such. Polyalkyleneoxy glycols include diethylene glycol, triethylene glycol, tetraethylene glycol, 1,2- and 1,3-dipropylene glycol, 1,2- and 1,3-tripropylene glycol, 1,2-, 1,3- and 1,4-dibutylene glycol, 1,2-, 1,3- and 1,4-tributylene glycol, etc. Triols which may be utilized as the initiating hydroxy organic compound include, glycerol, 1,1,1-trimethylolpropane, 1,2,3-trihydroxy butane, 1,2,3-trihydroxy pentane, 1,2,3-trihydroxy octane, 1,2,3-trihydroxy decane, 1,2,4-trihydroxy butane, 1,2,4-trihydroxy hexane, 1,2,6-trihydroxy hexane, 1,2,8-trihydroxy octane, and the like. Illustrative of other polyols which are suitable initiators include, sorbitol, pentaerythritol, erythritol, aromatic hydroxy compounds of the formulae:

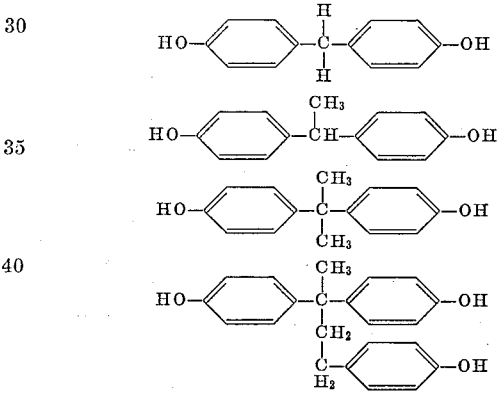

and the like, and the saturated (non-benzenoid) derivatives thereof; various other carbohydrates such as the monosaccharides and polysaccharides, e.g., cellulose; starch; glucosides, such as the lower alkyl (1 to 6 carbon atoms) glucosides, e.g., methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-frustoside, isobutyl-D-mannoside, ethyl-D-galactoside, benzyl-D-glycoside and methyl-L-rhammoside, sucrose; glycose glycoside; maltose; lactose; D-gulose, D-idose, hydroxyethyl cellulose; amylose, amylopectin; dextrin; and the like.

Desirably, the initiator is admixed with the alkylene oxide in a liquid phase and the basic or acidic catalyst is dispersed throughout the phase. Suitable basic catalysts include, alkali metal hydroxides such as sodium hydroxide and potassium hydroxide. Desirable acidic catalysts include Lewis acids such as boron trifluoride, aluminum chloride, and the like. The catalyst is added in catalytic amounts, i.e., amounts sufficient to effect reaction between the alkylene oxide and the initiating hydroxylated compound. When the catalyst is alkali metal hydroxide, amounts of from about 0.2 to 1.0 percent by weight of the alkylene oxide reactant is convenient. When the catalyst is a Lewis acid, such as boron trifluoride, amounts of from about 0.01 to 1.0 percent by weight of the alkylene oxide reactant is suitable. The reaction can be effected at temperatures of from 80° C. to about 160° C. and advantageously under pressures ranging from about 5 to 50 pounds per square inch gauge. The reaction is preferably carried out under essentially moisture free (anhydrous) conditions to minimize side reaction. The addition of the alkylene oxide is terminated when the calculated quantities thereof have been introduced into the system.

Illustrative organo polyesters which desirably possess residual hydroxy groups may be branched and/or linear. Branched-chain polyesters include those which are of the cross-linked variety. Moreover, the term "polyester" is meant to include polyesteramides which possess not only recurring ester linkages, but also recurring amide linkages. Such polyesters and polyesteramides are obtained by the reaction of an organic polycarboxylic acid and an organic polyol and/or an organic hydroxyl amine, or from polymerization of an alpha, omega-hydroxyorganocarboxylic acid and/or the corresponding alpha, omega-organolactone, e.g., epsilon caprolactone.

Illustrative of the polycarboxylic acids include, e.g., oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, muconic acid, alpha-dihydromuconic acid, beta-dihydromuconic acid, diglycolic acid, dilactic acid, thiodiglycolic acid, 4-amyl-2,5-heptadienedioic acid, 3-hexenedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 1,2,3-propanetricarboxylic acid, 1,2,4-benzenetricarboxylic acid, 1,3,5-benzenetricarboxylic acid, 3-hexene-1,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like.

The anhydride and acyl halides of the above polycarboxylic acids may also be employed when such are available. The polyols which may be reacted with the polycarboxylic acids to form the polyesters include, for example, the aforementioned alkylene oxide adducts or the initiating polyhydroxy substituted organic compounds per se. Hydroxy amines which may be employed include, ethanol amine, 3-aminopropanol, 4-aminopropanol, 5-aminopentanol, 6-aminohexanol, 10-aminodecanol, 6-amino-5-methyl hexanol-1, p-hydroxymethylbenzylamine, and the like.

Reaction between the polyisocyanates and the active hydrogen-containing organic compounds may be effected at temperatures ranging from 0° C. to 250° C., preferably from 25° C. to 150° C. The reaction is effected by intermixture of the components of the reaction, followed by heating of the mixture, if necessary.

The molecular weight and the hydroxyl number of the polyol when used for reaction with a polyisocyanate to form polyurethane foams will determine whether the resulting foam product is flexible or rigid. For example, the above polyols which possess a hydroxyl number of from about 200 to about 1000 are typically employed in rigid foam formulations, while those polyols having a hydroxyl number of from about 20 to about 150 or more are usually employed in flexible foam formulations. Such limits are not intended to be restrictive and are merely illustrative of the potential selectivity of the above polyol co-reactants. Other modifications of possible polyol combinations will be readily apparent to those having ordinary skill in the art.

The hydroxyl number, as used hereinabove, is defined by the equation:

$$OH = \frac{f \times 1000 \times 56.1}{\text{molecular weight}}$$

wherein OH is the hydroxyl number of the polyol, $f$ represents functionality (i.e., average number of hydroxyl groups per molecule of polyol), and molecular weight is the average molecular weight of the polyol.

Methods for making the aforementioned polyurethane flexible foams are well documented in the art.

When preparing the foamed products, either the quasi-prepolymer technique or the one-shot technique can be employed. Both techniques are known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. These blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1,1,1-trifluoro-2-chloroethane, 1-chloro-1-fluoroethane, 1,1,1-trichloro-2,2,2-trifluoroethane, 1,1,2-trichloro-1,2,2-trifluoroethane, 1-chloro-2-fluoroethane, 2-chloro-1,1,1,2,3,3,4,4,4-nonafluorobutane, hexafluorocyclobutane, and octafluorocyclobutane.

Other useful blowing agents include low-boiling hydrocarbons such as butane, pentane, hexane, cyclohexane, and the like. Many other compounds easily volatilized by the exotherm of the isocyanate-hydroxyl reaction can also be employed. A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general, it may be stated that for 100 grams of reaction mixture containing an average NCO/OH ratio of about 1:1, about 0.005 to 0.3 mole of gas is used to provide foams having densities ranging from 30 to 0.8 pounds per cubic foot, respectively.

A conventional catalyst can be employed in the reaction mixture for accelerating the isocyanate-hydroxyl reaction. Such catalysts include a wide variety of compounds such as, for example, (a) teritary amines such as trimethylamine, 1,2,4-trimethylpiperazine, 1,4-dimethylpiperazine, N-methylmorpholine, N-ethylmorpholine, N,N-dimethylbenzylamine, bis(dimethylaminomethyl) - amine, N,N-dimethylethanolamine, N,N,N',N'-tetramethyl - 1,3-butanediamine, triethanolamine, 1,4-diazabicyclo[2.2.2]-octane, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis - acetylacetonealkylenediamines, salicylaldehydeimine, and the like; with various metals such as Be, Mg, Zn, Cd, Pb, Ti, Zr, Sn, Sb, As, Bi, Cr, Mo, Mn, Fe, Co, Ni or such ions as $MoO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of these alcoholates with carboxylic acids, betadiketones and 2(N,N-dialkylamino) alkanols, such as the well known chelates of titanium obtained by said or equivalent procedures; (g) salts of organic acids with a variety of metals such as alkali metals, alkaline earth metals, Al, Sn, Pb, Sb, Mn, Co, Ni and Cu, including, for example, sodium acetate, potassium laurate, calcium hexanoate, stannous acetate, stannous octoate, stannous-2-ethyl hexanoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin - bis[4 - (N,N'-dimethylamino)benzoate], dibutyltin-bis[6-(N-methylamino) - caproate], and the like. Similarly, there can be used a trialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin bis (isopropoxide), dibutyltin - bis(2-diethylaminopentylate), dibutyltin dichloride, dioctyltin dichloride, and the like.

The tertiary amines may be used as primary catalysts for accelerating the active hydrogen-isocyanate reaction or as secondary catalysts in combination with metal catalysts. The catalysts are employed in small amounts, for example from about 0.001 percent to about 5 percent, based on the weight of the reaction mixture.

It is also desirable to employ small amounts, e.g., about 0.001 percent to 5.0 percent by weight, based on the total reaction mixture, of an emulsifying agent such as siloxaneoxyalkylene block copolymer having from about 10 to 80 percent by weight of siloxane polymer and from 90 to 20 percent alkylene oxide polymer, such as the block copolymers described in United States Patents Nos. 2,834,748 and 2,917,480.

Another class of useful emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon to silicon bonds, rather than through carbon to oxygen to silicon bonds. The copolymers generally contain from 5 to 95 weight percent, and preferably from 5 to 50 weight percent of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed the foam products of the invention can be prepared without emulsifiers in some cases.

The flexible open-cell polyurethane foams suitable in this invention may have a density ranging from about 0.6 pound per cubic foot and lower, up to about 6.0 pounds per cubic foot and higher. A significant facet of this invention involves the compression of a polyurethane foam which possesses porosity to air, water-vapor, and liquid-water. If the foam has these properties, it is desirable for use in the process of this invention.

Though the polyurethane foams have been described in considerable detail, particularly with respect to their manufacture and chemical composition, such details are not to be construed as limitations on this invention. Any polyurethane foam may be employed in the practice of this invention so long as it is a flexible foam material having a substantial amount of open-cell structure and is porous to air, water-vapor and liquid-water.

The process of this invention is particularly effective in producing a sheet of permanent compressed, flexible polyurethane foam having a discontinuous resin coating on at least one of its surfaces. By discontinuous coating, it is meant that the coating to the eye appears continuous but possesses open voids therethrough which allow transport of moisture through the coating.

The resin coating is typically of an organic resin such as obtained from a thermoplastic or thermosetting organic resin, particularly synthetic resins. Preferably, the resin, when a continuous film independent of the compressed foam, has a Sward hardness greater than that of the compressed polyurethane foam free of the discontinuous coating. In addition, it is preferred that the resin employed in forming the discontinuous coating be capable of forming a film, which when dried or cured, is tackfree to touch.

A thermoplastic resin is a heat-fusible resin which softens when heated, and when cooled, loses its softened characteristics. Some thermoplastic resins become liquid or molten on heating and solidify on cooling. A thermosetting resin is a resin which has the property of attaining a heat infusible (thermoset) condition from heat and/or a chemical reaction whereby polymerization occurs. An infusible state may be also termed one indicated by decomposition on heating of the resin to a high temperature. A thermosetting resin may be also a resin which transforms from a fusible (softened) or liquid state to an infusible solid state. In addition, some thermoplastic resins may be transformed to a thermoset resin. Such transformation may be achieved by solid state polymerization and/or cross-linking. If such a transformation is attainable from a thermoplastic resin, it is considered for the purposes herein, to be still classed as a thermoplastic resin. It should be understood that the selection of the resin in the production of the products of this invention is not narrowly critical. So long as the resin, when employed to form a discontinuous coating as illustrated herein, forms a coated compressed foam product which possesses greater scuff and scratch resistance than the compressed foam alone, then the resin is suitable for practice in the present invention.

Usable heat-fusible or thermoplastic resins are those which are produced by the inter-reaction of ethylenically unsaturated organic compounds. The most desirable resins are those which are formed by the inter-reaction of at least one monoethylenically unsaturated organic compound. Such a resin may also be obtained from polyethylenically unsaturated monomers which react, in some instances, linearly like a monoethylenically unsaturated monomer. Illustrative of such monomers include, for example, butadiene, isoprene, chloroprene, cyclopentadiene, and the like. However, it is not intended to exclude resins which comprise as one of the reactants a polyethylenically unsaturated monomer which typically does not react as a monoethylenically unsaturated monomer. However, it is preferred that these type of monomers be employed in small quantities, typically not more about about 5 mole percent of the total moles of monomer used in forming the resin. The latter type of monomers typically cause cross-linking during the formation of the resins and result in a rather infusible and/or insoluble resinous composition. Therefore, it is desirable to keep their concentration in the manufacture of the resin as low as possible. However, if such monomers when utilized in the manufacture of the resin do not cause an amount of cross-linking sufficient to produce a product which is infusible or insoluble then, of course, the monomers may be employed in amounts in excess of 5 mole percent. Illustrative cross-linking monomers include, divinyl benzene, tetra-allylsilicate, and the like. The most desirable resins made from the aforedescribed monoethylenically unsaturated monomers are usually thermoplastic. Practically all of the known thermoplastic resins made from such monomers are suitable in the practice of this invention Heat-fusible resins which may be employed in the practice of this invention may be obtained by either the homopolymerization or inter- or co-polymerization of the following illustrative ethylenically unsaturated monomers: ethylene, propylene, butylene, pentylene, cyclobutene, cyclopentene, cyclohexene, cyclooctene, cyclopentadiene, butadiene-1,3, isoprene, chloroprene, pentadiene-1,3, hexadiene-1,3, styrene, alpha-chlorostyrene, para-chlorostyrene, alpha-methylstyrene, beta-methylstyrene, 1,4-divinylbenzene, para-ethylstyrene, para-isopropylstyrene, para-vinylbenzylamine, vinylchloride, vinylidenechloride, allylchloride, vinylfluoride, vinylbromide, divinylcarbonate, diallylcarbonate, dicyclohexenyl-4-carbonate, vinylacetate, vinylformate, vinylpropionate, vinylbutanoate, vinylbutyrate, acrylonitrile, alpha-alkylacrylonitrile such as methacrylonitrile, ethylacrylonitrile, and the like, diallylidene-pentaerythritol, acrolein, methacrolein, crotonaldehyde, acrylic acid, methacrylic acid, crotonic acid, maleic acid, fumaric acid, acrylamide, methacrylamide, N-methylacrylamide, N-methylolacrylamide, N-2-hydroxyethylacrylamide, ethylacrylate, methylacrylate, propylacrylate, isopropylacrylate, butylacrylate, 2-ethylhexylacrylate, n-octylacrylate, methylmethacrylate, ethylmethacrylate, dimethylmaleate, diethylmaleate, ethyl-2-ethylhexylmaleate, the dialkyl fumarates, e.g., methyl, ethyl, 2-ethylhexyl fumarate, tetrafluoroethylene, monochlorotrifluoroethylene, 3,3,3-trifluoropropene-1, N-vinyl-2-pyrrolidone, vinylsilane, vinyltrimethylsilane, allylsilane, 3,5-tetramethyl-3,5-disilyl-4-oxy-heptadiene-1,6 (sym.-divinyl-tetramethyldisiloxane), divinyl cyanurate, diallyldimethylsilicate, triallylphosphate, diallylphosphate, divinylether, vinylmethylether, vinylethylether, vinylbutylether, allylglycidylether, methylvinylketone, ethylvinylketone, butylvinylketone, and the like monomers.

An illustrative list of polymers formed from the aforedescribed monomers, which list is not to be construed as limiting the type of useful heat-fusible resin polymers usable in this invention, include, for example, polyethylene, polypropylene, polybutylene, polybutadiene, poly (vinyl chloride), polyvinylacetate, copolymer of vinylchloride and vinylacetate, copolymer of acrylonitrile and butadiene, copolymer of butadiene and styrene, polyethylacrylate, copolymer of vinylacetate and 2-ethylhexylacrylate, copolymer of vinylacetate, 2-ethylhexylacrylate and acrylic acid, poly-2-ethylhexylacrylate, copolymer of ethylacrylate, butylacrylate and 2-ethylhexylacrylate, copolymer of vinylchloride and vinylidene chloride, polyvinylfluoride, copolymer of acrylonitrile and vinylacetate, copolymer of acrylonitrile and vinylchloride, copolymer of ethylene and diethylmaleate, copolymer of acrylic acid, ethyl acrylate and 2-ethylhexylacrylate, association product of poly(acrylic acid) and poly(ethyleneoxide), copolymer of vinylalcohol, vinylacetate and vinylchloride, polyvinylbutyrate, polyvinylpropionate, copolymer of methylvinylketone and N-vinyl-2-pyrrolidone, poly-N-vinyl-2-pyrrolidone, copolymer of diallylidene glycerol and vinylchloride, copolymer of diallylidene pentaerythritol and vinylchloride, and the like.

In addition to the heat-fusible resins obtained from addition polymerization of ethylenically unsaturated monomers, there may be also employed heat-fusible or thermoplastic resins such as those produced by condensation of complementary and polyfunctional monomers and by addition of non-ethylenically unsaturated monomers. The list of such types of resins is long and encompasses a wide variety of resinous materials. The following is considered merely illustrative of the usable resins of this class since to specifically describe each and every one of the members of this class would make the description of this invention unduly prolix.

For example, there may be employed the linear or substantially linear polyurethane resins obtained from the reaction of difunctional polyol reactants and organic diisocyanates. Usable polyol reactants include the polyhydric compounds described previously with respect to foam manufacture. Thus, short chain alkane diols and/or polyether diols and/or polyester diols may be reacted with organic diisocyanates, such as the tolylene diisocyanates and bis(4-isoycanatophenyl)methane or other diisocyanates such as mentioned above, to produce a linear polyurethane resin. Various methods may be employed to produce the resin, e.g., isocyanate end-blocking or terminating the polyol by reaction of a double stoichiometric amount of diisocyanate to polyol followed by further reaction with more polyol or forming a prepolymer from reaction between the polyol and diisocyanate and reacting the prepolymer with either more polyol or diisocyanate depending upon the terminal groups of the prepolymer. Such techniques are well understood by the art. Particularly preferred are the polyurethane resins formed from hydroxyl terminated linear polyesters such as those described previously for making the foam. Thus, the linear polyester terminated by hydroxyl groups may be reacted with a diisocyanate to form a substantially linear polyester-polyurethane resin which exhibits thermoplastic properties. Particularly desirable are polyurethane resins obtained from reaction of a dihydroxyl-terminated polyester, an alkane diol and a diisocyanate such as described in United States Patent No. 2,871,218, issued Jan. 27, 1959. The polyesters may be formed by, e.g., reaction between an organic dicarboxylic acid and an organic diol, or from the polymerization or an organo-lactone, such as epsilon-caprolactone.

Another particularly desirable thermoplastic polyurethane resin is one containing both recurring urethanyl and ureyl radicals. Such a resin may be formed by reacting a polyether diol or a diol-terminated polyester with an organic diisocyanate. The diisocyanate is reacted with the diol reactant, preferably to form either a diisocynate terminated polyether or polyester or a diisocyanate terminated polyether-polyurethane or polyester-polyurethane. The resulting isocyanate-terminated product may thereafter be reacted with a diamino compound such as hydrazine, N,N'-alkyl substituted hydrazines, alkylene diamines (e.g., ethylene diamine, tetramethylene diamine, hexamethylene diamine), arylene diamines (e.g., 1,4-phenylene diamine, bis(4-aminophenyl)-methane, bis(4-aminophenyl)amine, and the like), as well as other diamines.

The aforedescribed polyurethane resins may have molecular weights ranging from about 1,000 up to 100,000 or more, depending upon the operative viscosity of the resin for use herein and the toughness of the coating desired. As a rule, these particular polyurethane resins possess a substantial degree of elasticity and such characteristic lends greatly to the toughness of the resulting discontinuous coating. The aforedescribed polyurethane resins are particularly preferred for this invention.

Typical thermoplastic or heat-softening condensation resins which may be employed herein include polyamide resins (e.g., the nylon type), polyester resins, polyoxymethylene resins (i.e., polyformaldehyde resins), linear phenol-formaldehyde resins, linear high-molecular weight organosiloxanes, polyester polyamide resins, mixtures of the above resins, and the like.

Suitable polyamides are those which are obtained from the reaction of dicarboxylic acids (such as, oxalic acid, succinic acid, adipic acid, sebacic acid, 1,3-cyclobutane dicarboxylic acid, 1,4-cyclohexane dicarboxylic acid, terephthalic acid, tetrahydroterephthalic acid, isophthalic acid, tetrahydroisophthalic acid, and the like) or the corresponding acid halide (e.g., chloride) with a diamine (such as ethylene diamine, tetramethylene diamine, hexamethylene diamine, piperazine, the alkylpiperazines, 1,4-phenylene diamine, 1,3-phenylene diamine, bis(aminomethyl)benzene, bis(4-aminophenyl)methane, bis(4-aminophenyl)amine, bis-2,2(4-aminophenyl)propane, and the like) employing procedures well known in the art. Other usable polyamides include, poly ($\epsilon$-caprolactam), poly(omega-capryllactam), and the like, and polyamides obtained from reaction of a dimerized fatty acid and a diamine (such as described above), e.g., the reaction product of dimerized linoleic acid and hexamethylene diamine, and the like.

Suitable thermoplastic polyesters employable herein may be obtained from the reaction between the aforedefined dicarboxylic acids and the diols described above with respect to the manufacture of the polyurethane foam. The suitable polyester polyamide resins include those obtainable for reaction of a stoichiometrically proper amount of the aforedefined diamines dicarboxylic acids or acid halides, and alkane or alkylene ether diols.

The thermosetting resins employable for forming the discontinuous coating of this invention may be any of those known to the art. Illustrative thermosetting resins include, e.g., urea-formaldehyde resins, malamine-formaldehyde resins, phenol-formaldehyde resins, cross-linkable polyurethane resins, alkyd resins, cross-linkable polyacetals, polyepoxides, cross-linkable polyamides, silicone resins (i.e., polyorganosiloxane resins wherein the organo (e.g., methyl, ethyl, ν-aminopropyl, etc.) radical to Si ratio is less than 1.9 and greater than 0.4), mixtures of the above, and the like. It should be understood that the selection of the resin in the production of the products of this invention is not narrowly critical. So long as the resin, when employed to form a discontinuous coating as illustrated herein, forms a coated compressed foam product which possesses greater scuff and scratch resistance than the compressed foam alone, then the resin is suitable for practice in the present invention.

The suitable urea-formaldehyde resins are typically produced from reaction of urea and formaldehyde in the presence of a basic catalyst to form either monomethylol urea or dimethylol urea, depending upon the amount of formaldehyde employed. The methylolated urea may be condensed in the presence of an acidic or basic catalyst to form a more viscous material to a hard resin. It is preferred to control polymerization or condensation to preclude formation of a solid product. Another most desirable urea-formaldehyde product is an etherified urea-formaldehyde resin. This is obtained by reacting the methylolated urea with an alkanol, e.g., methanol, ethanol, the propanols, the butanols, the hexanols, the octanols, etc., in the presence of an acidic catalyst a most desirable resin is obtainable. Variations in the hardness and flexibility of the cured resin typically depend on the degree of condensation, the selection of alkanol and the amount employed.

Melamine may be methylolated in similar manner to methylolation of urea. The methylolated melamine is thereafter condensed in an alkaline or, preferably, an acid medium to produce liquid resins which can be cured by heating. The methylolated melamine may be etherified in a manner similar to that employed for methylolated urea. The melamine-formaldehyde resins are desirably produced by reacting at least one mole of formaldehyde per mole of melamine. Known variations in production are employed to vary the properties of the resulting resin.

Pheno-formaldehyde resins include not only the reaction of formaldehyde with phenol but also the reaction of formaldehyde with other hydroxylated aromatic compounds such as ortho, meta and/or paracresol, 2,4 and/or 3,4 and/or 2,5 and/or 3,5 xylenol, bis-phenol-A(2,2-bis-(4-hydroxyphenyl)propane), biphenol, bis(4 - hydroxyphenyl)methane, para-phenylphenol, paracyclohexylphenol, para-tert.-butylphenol, para-tert.-amylphenol, and the like. The reaction is typically achieved in an acid or alkaline medium. The acidic system achieves a faster reaction. The alkaline system achieves slower reactions and thereby allows production of methylolated phenol. The hardness and flexibility of the finished and cured resin is dependent in part upon the molar ratio of formaldehyde to phenol or other hydroxy aromatic compound in the reaction system. The preferred resins employed herein are the A, B, etc., stage resins, i.e., resins which are not completely condensed and are liquid or soluble at ambient temperatures.

Cross-linkable polyurethane resins employable herein are those described previously except that the resins, prior to cure, possess free isocyanato groups. That is, the concentration of polyisocyanate in making the resin is in stoichiometric excess over the diol concentration employed in making the resin. The greater the excess, the greater the degree of cross-linking in the cured resin. As a rule, the more cross-linked is the resin, the less elastic is the cured product.

Usable alkyd resins include reaction products of polyols and polycarboxylic acids and oil or fatty acid modified reaction products of polyols and polycarboxylic acid. The usable polyols and polycarboxylic acids include those described above in making polyesters. However, in making thermosetting resins, at least one of the polyol and polycarboxylic acid must be trifunctional or possess greater functionality, e.g., trifunctional glycerol or tetrafunctional pentaerythritol may be reacted with difunctional maleic acid or phthalic acid or their anhydrides. As a rule, the alkyd resins are produced in either a basic or acidic medium, preferably in an acidic medium. The esterification reaction is typically catalytically induced and preferably with metal salts, e.g., tin, copper, lead, zinc salts, and the like. However, this does not preclude use of alkyd resins which are produced in the absence of a catalyst. The alkyd resins may contain in the reaction product, residues of vegetable and marine oils, such as linseed oil, tung oil, cottonseed oil, codfish oil, soybean oil, and the like. Thus, during or on reaction between the polyol and polycarboxylic acid, such oils or the fatty acids from such oils may be introduced to the reaction to provide oil modified alkyd resins.

Cross-linkable polyacetals usable in the practice of this invention include a variety of resinous compositions. For example, acetals such as diallylidene pentaerythritol

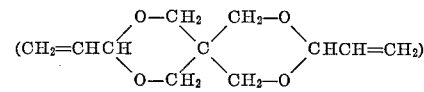

allylidene glycerol

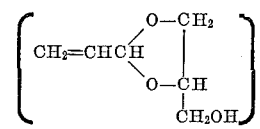

as well as other reaction products of acrolein and other polyols, particularly triols, tetrols, etc., may be reacted in the presence of a peroxide catalyst, e.g., hydrogen peroxide, benzoyl peroxide, and the like, or in the presence of a strong acid catalyst, such as sulfuric acid, benzene sulfonic acid, methane sulfonic acid, benzyl sulfonic acid, and the like. In addition, the same acetals may be reacted in the presence of the acid catalyst with a hydroxylated organic compound such as phenol, catechol, hydroquinone, alkylated phenols, alkane diols (as described above), mixtures of the above, and the like.

Usable cross-linkable polyepoxides include the well known reaction product of bis-phenol-A

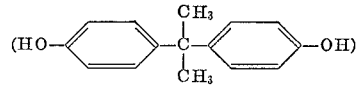

and epichlorohydrin, dicyclopentadiene dioxide, 3,4-epoxy-6-methylcyclohexylmethyl - 3,4 - epoxy - 6- methylcyclohexanecarboxylate, and the like, with acid or basic catalysts and organic hardeners, such as amines, polycarboxylic acids and anhydrides, polyols, polythiols, and the like.

Cross-linkable polyamides include the reaction between polycarboxylic acids and polyamines wherein at least part of the reactants are at least trifunctional, e.g., a tricarboxylic acid, tetracarboxylic acid, etc., triamines, tetraamines, penta-amines, etc. To illustrate, a dicarboxylic acid may be reacted with a triamine or tricarboxylic acid may be reacted with a diamine. In addition, a mixture of di- and tricarboxylic acids may be reacted with diamines or a mixture of diamine and triamine may be reacted with dicarboxylic acid. A preferable polyamide includes a linear polyamide from a dicarboxylic acid and a polyalkylene polyamine (e.g., diethylene triamine, triethylene tetra-amine, etc.) further reacted with epichlorohydrin. Usable polycarboxylic acids and polyamines are described previously.

Though the cross-linkable (thermosetting) resins may be employed alone to form the discontinuous coating, it is especially preferred that the thermosetting resin be premixed with a thermoplastic resin. It is particularly preferred to utilize the thermosetting resin in admixture with a compatible thermoplastic resin, wherein the thermoplastic resin is at least 5 weight percent of the mixture basis weight of the resins in the mixture. It is more preferred to provide the thermoplastic resin in the mixture in amounts at least 15 weight percent, most preferably at least 25 weight percent, basis weight of the resins in the mixture. By admixing the thermoplastic resin with the thermosetting resin, the admixture forms a flexible, non-brittle discontinuous coating. In the absence of admixture of the thermoplastic resin, the thermosetting resins tend to yield a brittle discontinuous coating which is unacceptable for many purposes where flexibility is important.

The method for forming the permanently compressed polyurethane foam containing the discontinuous coating involves the following steps: impregnating through at least one surface of uncompressed foam with the resin, in liquid state; drying the impregnated resin, if needed, to remove at least the substantial amount of solvent present; and compressing the foam as described above. The manner by which impregnation through a surface of a sheet of uncompressed foam may be effected are many and the choice of procedure may be decided by economics or by the properties of the foam and coating resin, particularly the density of the foam and the viscosity of the resin in liquid state when employed.

A most simple procedure involves placing a liquid layer of the resin (desirably a solvent solution or dispersion of the resin) on a substantially impermeable surface, such as glass, and laying upon the liquid layer a sheet of uncompressed open-cellular polyurethane foam. The free surface of the sheet, i.e., the surface opposite that in contact with the liquid layer of resin, is substantially uniformly flexed by compressing upon the free surface a number of times whereby most of the resin comprising the layer is sponged into the foam sheet. The resin impregnation can extend from surface to surface of the sheet. Preferably, resin impregnation does not extend move than 75 percent of the foam sheet thickness, preferably not more than 50 percent of the foam sheet thickness. These preferred impregnation limits are generally applicable in the practice of this invention.

The impregnated foam sheet is placed in an oven (desirably a vented oven) at a temperature typically below the softening or curing temperature of the resin and under conditions which preclude flashing of solvent vapors. After all or substantially all of the solvent has been vaporized from the sheet, the sheet is withdrawn from the oven and is permanently compressed.

Impregnation of the foam sheet may be effected in a three-roll mill by feeding the resin solution and uncompressed foam to the rollers. The foam is initially contacted with the resin and thereafter the foam containing the resin on a surface is compressed in the rollers to sponge in the resin. After drying to remove solvents, the impregnated, uncompressed foam may thereafter be permanently compressed. Another technique for effecting impregnation involves putting on a knife coating of resin on a surface of uncompressed foam sheet and thereafter temporarily compressing the coated sheet between rollers to effect impregnation. If greater impregnation is desired, the above impregnation procedures may be repeated.

The above cited resins which are considered for this invention are not to be construed as limiting the scope of the type resins which may be employed but merely as being illustrative of the resins employable in the practice of this invention.

The impregnating resins may be pigmented, filled or contain dyes. For example, the resins may be pigmented with such pigments as titanium dioxide, zinc oxide, lead oxide, aluminum, carbon black, the iron oxides, the metal chromates, the siliceous pigments, etc. The resins may also contain fillers such as the siliceous fillers, e.g., clays, silica, magnesium silicate, calcium silicate, silica gels (e.g., aerogels, xerogels, etc.), Bentonite, asbestos, and the like. Such pigmentation provides an easy method for coloring the resulting coated compressed product. Such coloration is particularly effective when the foam is also pigmented or dyed. Such coloration of the foam may be effected by adding the pigment or dye during foam formation or by immersing the foam in a dye or pigment liquid medium whereby the solid foam is uniformly colored. Such coloration of the foam provides a uniformly colored product regardless of the abuse given the coated product.

The temperature of drum 1, alone, or in conjunction with belt 3, or the temperature of the foam during compression, typically should be at least as high as the softening temperature of the thermoplastic resin or the curing temperature of the thermosetting resin but below a temperature sufficient to melt or decompose the foam as described above. If the foam is not surface impregnated, as described immediately above, similar temperature conditions are employable. Higher or lower temperatures may be employed. Usually, the applied temperature during compression is at least 50° C., and typically not higher than 300° C. The higher the temperature employed the less time is needed for compression.

Thus, drum 1 and belt 3 may be at 300° C., and the foam may be compressed for a period of time typically less than 30 seconds, often less than 10 seconds. The correlation of time and temperature will determine the conditions desired to effect compression. It is typically most desirable to employ the lowest operative temperature over the desired time of compression in the practice of this invention. Most often a temperature of at least 100° C. and not more than 300° C. will be suitable when compression is effected for periods of time ranging from about $\frac{1}{10}$ second up to 5 minutes.

An important consideration when effecting compression is the fact that the resultant compressed product possesses porosity (perviousness) to water-vapor and, typically, to air as well. This means that the temperature and degree of compression must not be so great as to produce a product which is devoid of these desirable features. Moreover, the amount of impregnating resin, if employed, should not be so great as to plug up the permanently compressed foam and eliminate porosity. In addition, the product must possess a permanent state of compression such as defined above. Therefore, the degree to which the foam sheet is compressed should be coupled with the temperature of the foam to produce an air and water-vapor pervious, permanently compressed foam product.

The temperature and degree of compression are not narrowly critical since a correlation of temperature and degree of compression can be considerably varied to achieve the desired compressed product. However, care should be taken to avoid selecting a degree of compression and a foam temperature which produces a compressed product devoid of the desired porosity.

The uncompressed foam may be partially compressed before total compression to achieve the desired product. However, for the purposes of this invention, the values indicating degree of compression are determined by the thickness of the foam prior to any heat compression and the thickness of the finished product. Any intermediate thickness achieved by partial compression is considered part of the overall process to achieve the ultimately desired degree of compression.

It has been found most desirable to compress a heat-fusible resin surface impregnated or unimpregnated, uncompressed foam to at least about 50 percent of its thickness, preferably to at least about 25 percent of its thickness, and desirably to not more than about two percent of its thickness. For example, as a guideline, it has been noted that when a foam having a density in the range of from about 1.2 is compressed to about 2 percent of its thickness, the resultant product typically approaches the minimum porosity to air and water-vapor.

Though the compressed foam product (preferably, a compressed foam containing the discontinuous coating) may be more favorably utilized as such as a fabric and leather replacement, it typically does not possess sufficient strength for commercial utilization in these areas. As a rule, such products are deficient in tensile strength and tear strength though the coated product possesses remarkable scuff and scratch resistance. These compressed foams are most desirably employed when associated with a layer of another material possessing considerable tear and tensile strengths.

A most desirable embodiment of this invention involves the lamination of the coated compressed foam product with a sheet material, particularly a fibrous fabric material. It is particularly desirable to employ a fibrous fabric material in view of its known porosity to air and water-vapor. One important feature of any leather or fabric replacement is this porosity characteristic. Since the compressed foam described above possesses a substantial degree of air and water-vapor porosity it would be unadvantageous to laminate such a product to a sheet or layer of material deficient in such porosity.

The fabric material may be woven, non-woven, or knitted fabric of any of the conventional fibers employed in the art for the manufacture thereof. For example, the fabrics may be made from any fiber commercially available, such as the following: cotton, mohair, hog hair, silk, wool, alpaca, vicuna, camel hair, rayon, viscose, nylon, e.g., polyhexamethyleneadipamide, polyhexamethylenesebacamide, poly(epsilon - caprolactam), polyesters such as polyethylene terephthalate as available under the trademarks "Dacron," "Terylene," and "Fortrel," cellulose acetate such as cellulose triacetate, polypropylene, copolymers of vinyl chloride and vinylidene chloride, e.g., as available under the trademark of "Saran," copolymers of vinyl chloride and acrylonitrile, e.g., as available under the trademark "Dynel," polyacrylonitrile such as those available under the trademark "Orlon," polyurethanylureyl elastomeric Spandex fibers such as available under the trademark "Lycra," glass fibers such as those available under the trademark "Fiberglas," polyester fibers such as those available under the trademark "Kodel," and the like. It is not intended that the above list of fibers should be construed as limiting the type of fabrics which may be employed.

The formation of the laminate, which is represented by at least one layer of the coated compressed foam bonded to at least one layer of fabric, may be effected in various ways. Uncompressed foam impregnated with the resin may be contacted with a fabric, such as defined previously, and the resulting multi-layer piece may thereafter be compressed in the drum and belt assembly whereby the foam is permanently compressed as described previously. On the other hand, the surface impregnated foam may be compressed according to this invention prior to lamination or bonding to the fabric. In either case, a resinous binder or adhesive may be applied on at least one of the surfaces of the foam and/or fabric which are contacted to form the laminate. The laminate may be formed by uniting the compressed foam sheet and fabric between the drum 1 and belt 2 as defined above for compression. If no binder is employed, then a heat setting fusible resin incorporated in the foam during its manufacture can be used as an adhesive to firmly bond the compressed foam layer to the fabric layer. It is typically preferred to apply a binder to either the surface of the fabric or the surface of the foam, or both, that are to be contacted to form the laminated structure.

Since the art of the manufacture and characteristics of woven and knitted fabrics is well known, further discussion regarding the description of these fabrics is not considered necessary. It is to be understood that any woven or knitted fabric may be employed in the practice of this invention to form a leather or fabric replacement possessing admirable qualities. The laminates which are formed from the compressed foam and woven or knitted fabrics have a plurality of uses. The are particularly suitable as an upholstery covering material, as a wall covering material, as a door panelling decorative covering for use in, e.g., automobiles, for clothing (particularly coats), hats, and many other areas. For example, in the automotive industry, the upholstery material conventionally employed comprises plasticized poly(vinylchloride) resin coated on a fabric and embossed to give a decorative appearance, typically embossed to give the appearance of leather. However, such material possesses many undesirable properties. As an illustration, it often becomes stiff at low temperatures, is not porous to air and water-vapor and thus becomes uncomfortable in hot weather, evaporates plasticizer tending to cause greasy deposits on the windshields, and often ruins painted finishes when in contact with such painted finishes. The laminates of this invention completely avoid these difficulties because the foam, preferably when discontinuously coated, may contain negligible, if any, plasticizer which can evaporate to cause greasy films or attack painted finishes. Moreover, the laminated products of this invention retain their flexibility over an extremely broad temperature range and, therefore, do not tend to become stiff or unduly soft when there occurs variations in temperature during the use of the automobile. These advantages and others, such as air and water-vapor porosity, are obtained through the use of the woven and/or knitted fabric-coated compressed foam laminates described herein. The binders (adhesives) which may be employed to form these laminates include the aforedefined heat-fusible (thermoplastic) resins and the resins described hereinafter as being suitable as binders or adhesives.

As indicated previously, the foam-fabric laminates may be formed in a plurality of ways. This is particularly the case when the foam is laminated to a non-woven fabric material. Such non-woven materials include, e.g., carded webs, compressed mats, non-woven, high-loft batts and compressed non-woven, high-loft batts. The foam may be permanently compressed prior to lamination to the non-woven fabric or may be permanently compressed after or during lamination to the non-woven fabric. All such compression is effected in the aforedescribed drum and belt assembly. If the fabric is a high-loft, non-woven batt, then it is often desirable to simultaneously permanently compress, as described above, a multi-layer interbonded piece of the uncompressed foam and the high-loft batt.

The resulting product from the permanent compression of the foam and high-loft batt is an air and water-vapor pervious laminated material. The product is absorbent on the batt side and, preferably, liquid-water impervious through the discontinuously coated foam surface. Typically, at least one layer of the foam is associated with at least one layer of the high-loft batt to achieve a product within the terms of this invention. The resultant laminated product then contains at least one layer of permanently compressed, high-loft, substantially non-woven fibrous batt.

Such a product may be produced by compression in the drum and belt assembly of a multi-layer piece containing at least one layer of flexible, open-cell, polyurethane foam and at least one layer of a substantially non-woven, fibrous batt to a thickness less than 50 percent of the piece while applying sufficient heat to the piece so that when pressure on the piece is relieved, the whole piece retains a permanently compressed state.

The resulting compressed product is a laminated material wherein the high loft, non-woven, fibrous batt layer is substantially separable and distinct from the compressed foam layer though each contacts the other. That is, the foam layer is not an integral part of the batt layer. However, considerable amounts of the compressed foam may be associated with the batt layer, having been pressed therein. However, the foam layer does not completely saturate the batt layer. On the other hand, the compressed foam layer is not saturated or is not completely impregnated by the non-woven, fibrous batt. Thus, each of the layers, the compressed foam layer and the non-woven, fibrous batt layer, is essentially distinctive and is essentially separably identifiable.

As indicated previously, the laminated product contains at least one layer of a permanently compressed foam and at least one layer of a substantially non-woven, fibrous batt. The layers which make up the laminated material may be associated with each other in a variety of ways, still resulting in a product which is suitable for a plurality of commercial uses. The following list is illustrative of various layer arrangements suitable in making the compressed laminated material. The first described layer will be representative of the uppermost layer, the next layer will be indicative of the second layer in contact with the uppermost layer, and any subsequent layers, as defined in sequence, will follow in contact with the preceding described layers.

(1) The uppermost layer may be the foam layer and the second layer may be a non-woven fibrous batt layer.

(2) The first layer may be a layer of foam, followed by a fibrous batt layer, followed by a foam layer.

(3) The first layer may be a foam layer, followed by a fibrous batt layer, followed by another foam layer, and then followed by another fibrous batt layer.

(4) The first layer may be a foam layer, followed by a batt layer, followed by another foam layer, then another fibrous batt layer, and finally another foam layer.

(5) The first layer may be a foam layer, followed by another foam layer, and finally by a layer of batt.

(6) The first layer may be foam, followed by two layers of batt in sequence.

(7) The first layer may be foam, followed by two batt layers in sequence, which in turn are followed by a layer of foam.

(8) The first two layers may be foam, followed by two batt layers in sequence.

(9) The first two layers may be foam, followed by two batt layers and then followed by two foam layers.

(10) The first layer may be a foam layer, followed by a batt layer, followed by another foam layer, followed by an additional batt layer, followed by a further foam layer, followed by a further batt layer, and then followed by an additional foam layer.

A variety of laminated materials may be made by varying the manner in which the layers are associated with each other. However, when the foam is surface impregnated with resin at least one of the outer layers of the piece should be this foam, and the impregnated surface of the foam should be an outermost surface of the piece out of contact with other surfaces of foam or batt employed in making the piece.

A surface or the surfaces of the foam which contact another layer of foam or batt may be coated with resinous binder compositions for the purpose of effecting a stronger bond between the foam and the batt or batts or between the foam with other layers of foam. Illustrative of such resinous binder compositions include, poly(vinylchloride) resins or plastisols, polyacrylic resins such as the alkyl acrylates (e.g., ethylacrylate-2-ethylhexylacrylate copolymers), epoxy resins such as the reaction product of epichlorohydrin and Bisphenol-A, alkyd resins such as oil-modified phthalic or maleic anhydride-glycerol polyesters, silicone resins, polyurethane resins (as described herein), and the like.

The non-woven fibrous batts typically represent an arrangement of fibers which form a self-supporting batt. The fibers may be held together in the batt by virtue of their distribution therein, by needling the fibers through a matrix such as foam, or by providing a resinous binder in the batt which fixes the fibers. Such batts are well known in the art as illustrated by the following United States patents: U.S. 2,719,802, issued Oct. 4, 1955; U.S. 2,784,132, issued Mar. 5, 1957; U.S. 2,879,197, issued Mar. 24, 1959; U.S. 2,734,841, issued Feb. 14, 1956; U.S. 2,757,100, issued July 31, 1956; U.S. 2,858,570, issued Nov. 4, 1958; and U.S. 2,994,617, issued Aug. 1, 1961. Preferably, the non-woven fibrous batts employable in this invention are the high-loft type described in United States Patents 2,784,132 and 2,879,197.

The most desirable batts are those which are made of non-matted (i.e., uncompressed) fibers, which may be drawn or undrawn, and which are arranged in the batt in three dimensions, i.e., in all directions along the length, width and depth of the batt. These are classed as high-loft batts. The three-dimensionally arranged fibers are non-matted (uncompressed) and are typically held against matting by a flexible resinous binder or by needling the randomly arranged fibers.

The batt is constructed of a plurality of fibers, preferably synthetic plastic fibers, either straight, crimped or curled, which may be of various lengths, e.g., from about ⅛ inch to 4 inches. These fibers are held in a three-dimensional, random arrangement by means of a flexible adhesive or binder, by virtue of the manner they are combined to form the batt, or by needling the batt in a loom or by needling the fibers through a base layer such as the foam so that most of the fibers locate on one or both of the surfaces of the base layer, or any combination of the above.

In making the batt, the individual fibers are first arranged in a three-dimensional random arrangement, and preferably, are wetted lightly with binder to cause them to adhere to each other only at their spaced points of contact. The application of binder and the drying thereof is effected without crushing the fibers of the batt. In consequence, the resulting batt is uncompressed and has an unusually high degree of softness and resilience and a very high loft. Although the batt may be handled and cut without any additional material bonded thereto, the application of additional material such as the aforedescribed foams and cloth materials, such as cheesecloth and nylon fabrics, may be utilized to facilitate the handling of the batt and the cutting thereof. The resulting batt may then be employed in the laminated foam-batt structure of this invention and may be permanently bonded to the foam by providing for an interlayer of adhesive (binder) between the foam and the batt.

The adherence of the three-dimensional randomly arranged fibers to each other at substantially only their points of contact imparts to the batt and to the laminated materials described in this invention, excellent dimensional stability.

The binder may be any resin which gives a flexible bond between the fibers of the batt. For example, the binder may be such elastic resins as natural or synthetic rubbers. These rubbers may be employed as a latex emulsion. However, most significantly desirable are poly(vinylchloride) resins or plastisols and polyacrylates such as poly-2-ethylhexylacrylate-ethylacrylate compolymers, as a resin or latex, and the like. The suitable synthetic rubbers include butadiene-styrene copolymers and butadiene-acrylonitrile copolymers. It is desirable that the binder for the batt is one which is reasonably compatible with the binder which may be applied to the surface of the foam. However, this invention does not preclude the use of incompatible binder systems.

The selection of the binder for the batt is not critical to this invention. There may be employed a wide variety of resinous compositions, e.g., vinyl resins and thermoplastic and thermosetting condensation type of resins. For example, there may be employed homopolymers and copolymers of vinyl chloride, vinylidene chloride, vinyl acetate, vinyl alcohol, vinyl butyrate, vinyl propionate, butadiene, acrylic acid esters, and the like. Such homopolymers and copolymers of the vinyl type include, e.g., poly(vinyl chloride) resins and plastisols; poly(vinylidene chloride); copolymers of vinylidene chloride and vinyl chloride; homopolymers of vinyl acetate and copolymers or terpolymers of vinyl acetate and vinyl chloride and/or vinylidene chloride; homo-, co- and terpolymers of polyethylene, polypropylene, and the previously defined vinyl monomers; association products of polyacrylic acids and poly(ethylene oxide); copolymers of maleic acid or maleic acid esters with vinylidene or vinyl compounds such as ethylene, vinyl chloride, vinylidene chloride, and/or butadiene; copolymers of butadiene and acrylonitrile, copolymers of acrylonitrile and vinyl acetate, copolymers of vinyl chloride and acrylonitrile, and the like. With respect to usable condensation polymers, there may be employed glycerol-maleic acid-linseed oil alkyd resins, phenol-formaldehyde resins, dimerized fatty acid-alkylene diamine polyamide resins, and the like.

Reference is made to United States Patent No. 2,784,132 for a complete disclosure of preferred non-woven fibrous batts usable in the instant invention. The disclosure of this patent is incorporated herein by reference. It is to be understood that the various resinous binders which are disclosed in United States Patent 2,784,132, may be employed in the operation of the instant invention with the advantages related in said patent.

The fibers which may be utilized in making the batt are those which have been described previously with respect to the general class of usable fabrics. Mixtures of the fibers described above may be used in forming the batts of this invention.

The denier of the fiber is typically not critical to the function of the batt in producing the laminated products of this invention; however, it is desirable to utilize fibers having an average denier per filament of from 0.5 to 400, preferably from 1 to 100. It is preferred that the fibers employed in making the batt are drawn, that is, have been oriented. However, in some applications, undrawn fibers and filaments have been found suitable.

As indicated previously, these high-loft batts are produced by three-dimensional random arrangement of the fibers into a batt which is thereafter needled and/or resin-impregnated to form an integrated batt structure. These batts may be produced in such equipment as the Rando-Webber made by the Curlator Corporation of East Rochester, N.Y. This equipment is described in that Corporation's bulletin No. 107, copyrighted 1963. Optionally, batt and foam may be interbonded by stitching after the batt has been formed in the Rando-Webber by passing the batt and foam through a loom. Then the batt may be impregnated with a resin such as those described above whereby the randomly arranged fibers of the batt are thoroughly interbonded.

On the other hand, the batt as produced by the Rando-Webber may be associated with the foam by laying the batt upon the foam and passing the two through a sprayer where a resinous binder is applied to the batt for the purpose of fixing the fibers.

It is apparent from the above discussion that various other techniques may be employed. It is also to be understood that the foam which is stitched to the batt or resin bonded to the batt may be in the compressed state or the uncompressed state. In the latter case, the bat and foam will be compressed simultaneously.

A most significant development involves the lamination of a compressed foam with a compressed batt. In this operation, each of the layers are pre-compressed prior to lamination. The most desirable product which falls within this concept is one which can be utilized as a leather replacement for shoe-uppers, handbags, sporting equipment, belts, clothing, and the like.

In this particular feature of the invention, a batt, which may be produced in the Rando-Webber, is thereafter passed through or immersed in a body of a resinous binder. Preferably, such a binder should possess less stiffness than the fibers making up the batt; however, this is not critical to the invention. Particularly desirable binders include those described above as the heat-fusible (thermoplastic) resins or the binders (adhesives) and include, e.g., powders, solutions, latices and plastisols of, e.g., rubbery poly (butadiene-acrylontrile) and poly(styrene-butadiene) copolymers, polyvinylchloride resins, copolymers of vinylacetate and 2-ethylhexylacrylate, copolymers of vinylacetate, 2-ethylhexylacrylate and acrylic acid, and the like. Particularly desirable resinous binders are the acrylonitrile-butadiene copolymers in latex form.

The high-loft batt, after immersion (dipping) in a liquid resinous binder composition, is thereafter squeezed to drive off excess binder. The amount of binder left in the batt will depend, in most cases, upon the solids concentration of the binder in the liquid medium (e.g., solution or latex of the resin), the length of time of immersion of the batt in the binder and/or the degree to which the batt is squeezed to drive off excess binder. When water latices are employed, the squeezed batt will contain water. The properties of the ultimate batt will be dependent upon the amount of binder left in the batt. Therefore, if it is considered necessary, repeated immersions may be employed to increase the amount of binder in the batt.

The batt now containing the binder may be dried in conventional ovens or oven heated rolls or drying drums to remove from the batt any solvent or liquid suspending agents (such as water). However, it may be desirable to spray the surface of the batt prior to this oven treatment with additional binder either of the same type or of a different type but which is also less stiff than the fibers comprising the bat. The dried batt may be utilized as such or may thereafter be sprayed with additional binder as indicated previously. The batt may be thereafter turned over and the other side of the batt may be similarly sprayed to incorporate the desired amount of the binder. The resin, when employed as a latex, may be, if desired, treated by effect coagulation thereof. Such may be accomplished by heating the batt or contacting the batt with such agents as, e.g., salts, alcohols, liquid hydrocarbons, and the like.

After further drying of the batt to insure that solvent has been removed, the batt may be optionally passed through the aforedescribed heated drum-belt assembly or through heated calender rolls typically at a temperature of at least 25° C., and usually not in excess of 600° C., whereby the batt is compressed. On the other hand, the batt may be compressed during the drying step, e.g., the wet bat may be fed over a series of heated drums in staggered arrangement while under enough tension to cause partial compression of the batt. This will result in a compressed batt structure which has a relatively smooth surface compared with batts which are not compressed. Any degree of compression is usable depending upon the type of product desired. A high degree of compression sufficient to permanently reduce the thickness of the batt to less than $\frac{1}{10}$ of its original thickness typically exhibits some stiffness. A lesser degree of compression of the batt so that the thickness thereof is at least 10 percent of the thickness of the batt prior to compression usually possesses a greater degree of flexibility and softness.

The aforedescribed batts may be needled in a loom prior to dipping or immersing in the resinous binder whereby to form a product which has greater tensile and tear strength. Rather than dip the batt into a bath of the binder it may be desirable to successively and sequentially spray, squeeze and dry the batt to achieve the same effect. In this technique, the batt, either needled or non-needled, may be sprayed with resinous binder, passed through rolls to squeeze out excess binder, and thereafter dried in an oven. This may be repeated a plurality of times to insure the incorporation of a substantial amount of binder in the batt.

Binders which are stiffer in the cured or dried state than the fibers of the batt tend to produce a very rigid, stiff and brittle product. These binders may be employed in the manufacture of the batts of this invention if such qualities are desired in the batt.

It may be desirable to treat the surface of the batt prior to lamination to the compressed foam. For example, the batt may be embossed, abraded to enhance its wicking action, combed to enhance wicking action and feel, and the like.

The permanently compressed polyurethane foam surface impregnated with the resin, may thereafter be bonded to the compressed resin impregnated batt using any of the aforedescribed binders (adhesives). The formation of the laminate of the compressed foam and compressed batt may be effected by contacting a surface of each with the other wherein at least one of the surfaces contains a binder (such as those described above) and lightly compressing the layers together with heat until they are firmly interbonded. Lamination can be achieved without heating when a pressure-sensitive adhesive is placed between the joined surfaces. If desired, the above procedure may be modified, e.g., by laminating a permanently compressed foam with the uncompressed batt and thereafter compressing the laminate to form a completely compressed laminated piece.

The following examples which serve to specifically illustrate this invention are not intended to be considered as limiting the scope of this invention.

EXAMPLES 1–30

Compression of the flexible polyurethane foam was effected on the following rotating drum-moving belt assembly.

The assembly was essentially the same as that depicted in the drawing. Cylindrical steel drum 1 had a diameter of 12 inches and a width of 5.5 inches. It was internally heated with steam. Cylindrical drive rolls 4 each had the same width as drum 1 and a diameter of 8 inches. The top roll 4 was driven by a variable speed motor-belt system. This assembly differed from that depicted in the drawing by having an 8 inch diameter, 5.5 inches wide, secondary roll positioned behind the bottom drive roll 4. This secondary roll was optionally employable. This secondary roll, when employed, contacted belt 3 as it draped over drum 1 and foam 2 (which in turn was in contact with drum 1 and belt 3) and, in addition, the secondary roll simultaneously contacted belt 3 as it traveled from belt tension roll 5 to the bottom drive roll 4. By moving belt tension roll 5 up, greater tension is exerted on belt 3, where it was draped over drum 1 and foam sheet 2 and as a result greater pressure was exerted on foam sheet 2. Conversely, by lowering roll 5, the tension on belt 3 at the drum vicinity was reduced and a pressure reduction was achieved. Moreover, the secondary roll, being in contact with belt 3 when draped over drum 1 and foam 2, acted to support belt 3 and also space belt 3 from drum 1. Belt 3 was made of steel and was 5 inches wide. Behind the belts were a bank of radiant heaters for the purpose of heating the belt to temperatures as high as 400° F.

The flexible polyurethane foam which was compressed in the above assembly was 4.5 inches wide and the thickness indicated below. The foam was made by the one-shot foaming technique using tolylene diisocyanate, a mixture of tris(diisopropylene glycol) phosphite and polypropylene oxide-glycerol adduct having a hydroxyl number of 70, stannous octoate catalyst, water, tetramethylbutanediamine, N-ethylmorpholine, silicone block copolymer (L–520 surfactant sold by Union Carbide Corporation) and 5 parts by weight basis weight of said mixture of polyvinylchloride resin. Methylene chloride was employed as a blowing agent.

The foam sheets, with and without resin impregnation through and across one surface of the sheet, were permanently compressed employing the conditions listed below for each example. The impregnated sheets were prepared by sponging in through one surface of the uncompressed sheet, 2 ounces per square yard of a resin mixture of 75 weight percent Estane 5740 x 2 (a thermoplastic polyurethane resin formed by reacting hydroxy-terminated polyester, bis(4-isocyanatophenyl)methane and 1,4-butanediol in stoichiometric proportions as described in U.S. Patent 2,871,218—it is sold by B. F. Goodrich Co.) and 25 weight percent of a copolymer of vinylchloride (87 weight percent of copolymer) and vinylacetate (13 weight percent copolymer).

| Example | Pressure on foam in lbs. per sq. in. | Residence time in minutes and seconds | Drum 1 temperature, °F. | Use of secondary Roll | Thickness of uncompressed foam in inches | Thickness of uncompressed foam in mils | Heat applied to Belt 3 | Miscellaneous Data |
|---|---|---|---|---|---|---|---|---|
| 1 | 50 | 1:55 | 335 | Yes | ½ | | Yes | |
| 2 | 50 | 1:55 | 335–340 | Yes | ½ | 15–21 | Yes | |
| 3 | 25 | 2 | 330 | Yes | ½ | | Yes | Last 10 inches stretched about 10% by putting tension on foam before compression. |
| 4 | 25 | 1 | 335 | No | ½ | | Yes | Not compressed. |
| 5 | 50 | 1 | 335 | No | ½ | | Yes | Compressed better than in Example 4. |
| 6 | 67 | 1 | 335 | No | ½ | | Yes | |
| 7 | 8.5 | 2 | 335 | No | ¼ | 15–19 | Yes | |
| 8 | 12.6 | 2 | 335 | No | ¼ | 12–14 | Yes | |
| 9 | 17 | 2 | 335 | No | ¼ | 11–12 | Yes | |
| 10 | 21 | 2 | 335 | No | ¼ | 9.5–10.5 | Yes | |
| 11 | 25 | 2 | 335 | No | ¼ | 9–10 | Yes | |
| 12 | 50 | 2 | 335 | No | ¼ | 8.5–9.5 | Yes | |
| 13 | 4.2 | 2 | 335 | No | ½ | 27–29 | Yes | |
| 14 | 8.4 | 2 | 335 | No | ½ | 28–31 | Heat cut back | |
| 15 | 12.6 | 2 | 335 | No | ½ | 25 | Heat increased | |
| 16 | 17 | 2 | 335 | No | ½ | 25 | Yes | |
| 17 | 21 | 2 | 335 | No | ½ | 25 | Yes | |
| 18 | 25 | 2 | 335 | No | ½ | 21–22 | Yes | |
| 19 | 36 | 2 | 335 | No | ½ | 21–22 | Yes | |
| 20 | 50 | 2 | 335 | No | ½ | 19 | Yes | |
| 21 | 50 | 0:55 | 335 | Yes | ½ | | Yes | Drum 1 not hot enough. |
| 22 | 25 | 2 | 335 | Yes | ½ | | Yes | 10 in. sheet was stretched to 10.5 in. compressed sheet. |
| 23 | 21 | 2 | 335 | No | ½ | | Yes | |
| 24 | 21 | 1:15 | 335 | No | ½ | | Yes | |
| 25 | 60 | 1 | 335 | No | ½ | | Yes | Resin impregnated foam fed to assembly with sheet of polyester film. |
| 26 | 17 | 2 | 335 | No | ½ | | Yes | Resin impregnated foam. |
| 27 | 17 | 2 | 335 | No | ½ | | Yes | Resin impregnated foam-used silicone release agent. |
| 28 | 25 | 2 | 335 | No | ½ | | Increased heat | Resin impregnated foam. |
| 29 | 50 | 1:15 | 335 | No | ½ | | Yes | Do. |
| 30 | 67 | 1 | 335 | No | ½ | | Yes | Do. |

In the above experiments, belt 3 was separately heated with an electrical radiant heater controlled by a rheostat. The temperature supplied to the belt and the belt temperature was not determinable. The series of examples above serve to illustrate that the degree of compression is controlled by correlating the three principal factors, to wit, residence time, pressure, and temperature. In addition, the examples above illustrate that the uncompressed foam sheet may be stretched during compression to produce yard goods of greater strength and greater area than the original uncompressed foam sheet. Also shown in the above examples is the technique of stretching the foam prior to compression by pulling on the uncompressed sheet as it enters the drum-belt assembly thereby exerting tension on the uncompressed sheet so that when the drum and belt grip and start to compress the sheet, it is in a stretched condition. As a result, one may increase the size of the compressed foam sheet up to 50 percent in length greater than the length of the starting uncompressed foam sheet.

EXAMPLE 31

Employing the drum-belt assembly described for the preceding examples with drum 1 at 335° F., with the secondary roll in operating position and the belt radiantly heated, three samples (i.e., a, b, and c) of ½ inch thick foam of the composition and size described for the preceding examples were compressed under the following variations in condition. Sample a was carefully compressed to avoid any stretching, sample b was compressed and stretched in the assembly without tension during feeding to achieve about a 5 percent stretch in length of the sheet, and sample c was fed to the assembly under tension to effect about a 10 percent in length stretch. Sample a exhibited a breaking strength of 8 pounds (grab method); sample b exhibited a breaking strength of 9 pounds (grab method); and sample c exhibited a breaking strength of 10 pounds (grab method).

EXAMPLE 32

In this example, the drum-belt assembly and procedure of Example 31 were employed. Two flexible polyurethane foam sheets, one being 1/10 inch thick and the other ¼ inch thick; and both being 4.5 inches wide were compressed for 1:15 minutes at 335° F. to a permanently compressed condition. The foam compositions were composed of the reaction product of tolylene diisocyanate and propylene oxideglycerol adduct having a hydroxyl number of 56.

Two additional 1/10 inch foam sheets were sandwiched about a non-woven, three-dimensional nylon 6,6 (polyhexamethyleneadipamide) fiber batt weighing 1.2 ounces per square yard and comprising 6/10 ounce per square yard of nylon fiber and 6/10 ounce per square yard of butadiene (60 mole percent)-acrylonitrile (40 mole percent) copolymer binder. The batt was formed in a Curlator Rando-Webber and spray bonded with the copolymer binder. The foam-batt laminate was fed to the above assembly and compressed for 1:15 minutes to form a permanently compressed laminate of good hand, flexibility, and strength.

Though the above disclosure describes this invention in considerable detail, such is not to be construed to limit this invention except to the extent provided in the claims.

It is also apparent that equivalent features not particularly described herein are considered to be encompassed by the above disclosure and the accompanying claims.

What is claimed is:

1. A continuous method for permanent compression of a sheet of flexible polyurethane foam, which comprises passing the side of a sheet of polyurethane foam against a rotating, heated cylindrical drum and compressing the foam sheet thereat by tension exerted on an endless moving belt exerting force on the opposite side of the sheet, the peripheral speed of said drum and the speed of said belt being such relative to one another as to avoid tearing of said foam sheet and maintaining the sheet under such compression at a sufficient temperature and for a sufficient period of time to effect permanent compression thereof.

2. The process of claim 1 wherein said foam is part of a multilayer piece which also comprises at least one additional sheet of foam.

3. The continuous process of claim 1 which comprises continually exerting tension on said foam sheet so that it is stretched prior to compression by said drum and endless belt.

4. The process of claim 1 wherein said foam contains a coating resin.

5. The process of claim 1 wherein said foam is part of a multilayer piece which also comprises a fabric.

6. The process of claim 5 wherein the fabric is a nonwoven batt.

7. The process of claim 1 wherein the temperature of one of the drum and belt is lower than the temperature of the other one.

8. The process of claim 4 wherein the sheet contains sufficient coating resin so that the resulting permanently comprssed sheet possesses a porous resin surface.

9. The process of claim 6 wherein the batt is sandwiched between sheets of said foam.

References Cited

UNITED STATES PATENTS

| | | | |
|---|---|---|---|
| 2,971,218 | 2/1961 | Bierer | 18—6 |
| 2,181,859 | 12/1939 | Baker et al. | 18—6 |
| 2,442,443 | 6/1948 | Swallow | 18—6 |
| 3,050,432 | 8/1962 | Winbrenner et al. | 264—321 X |
| 3,067,804 | 12/1962 | Magner | 18—6 |
| 3,104,192 | 9/1963 | Hacklander | 264—321 X |
| 3,189,669 | 6/1965 | Goldfein | 264—321 |
| 3,193,441 | 7/1965 | Schafer | 264—321 X |
| 3,196,197 | 7/1965 | Goldfein | 264—321 |

FOREIGN PATENTS

| | | |
|---|---|---|
| 599,493 | 6/1960 | Canada. |
| 773,809 | 5/1957 | Great Britain. |
| 911,427 | 11/1962 | Great Britain. |

OTHER REFERENCES

Rubber and Plastics Age, "Orientated Plastics Foams," vol. 43, No. 2, February 1962, p. 141.

JAMES A. SEIDLECK, *Primary Examiner.*

P. E. ANDERSON, *Assistant Examiner.*